United States Patent [19]

Bradley, Jr.

[11] Patent Number: 4,964,695
[45] Date of Patent: Oct. 23, 1990

[54] LENTICULAR ARRAYS FOR FRONT PROJECTION SCREENS AND CONTRAST IMPROVING METHOD AND DEVICE

[75] Inventor: Ralph H. Bradley, Jr., Kingsport, Tenn.

[73] Assignee: North American Philips Corporation, New York, N.Y.

[21] Appl. No.: 418,697

[22] Filed: Oct. 2, 1989

Related U.S. Application Data

[63] Continuation of Ser. No. 236,562, Aug. 25, 1988, abandoned, which is a continuation-in-part of Ser. No. 107,087, Oct. 6, 1987, Pat. No. 4,767,186.

[51] Int. Cl.$^5$ .............................................. G03B 21/60
[52] U.S. Cl. ..................................................... 350/129
[58] Field of Search ................................ 350/127–129

[56] References Cited

U.S. PATENT DOCUMENTS

| | | | |
|---|---|---|---|
| 1,759,777 | 5/1930 | Cawley | 350/127 |
| 2,313,947 | 3/1943 | Klinkum | 350/127 |
| 2,738,706 | 3/1956 | Thompson, Jr. | 350/127 X |
| 4,509,823 | 4/1985 | Moriguchi et al. | 350/128 |
| 4,573,764 | 3/1986 | Bradley | 350/128 |
| 4,605,283 | 8/1986 | Stanton | 350/127 |
| 4,647,519 | 3/1987 | Spiegel | 350/128 X |
| 4,660,930 | 4/1987 | van der Hoorn et al. | 350/128 X |
| 4,682,853 | 7/1987 | Broer et al. | 350/128 |
| 4,688,093 | 8/1987 | van der Stack et al. | 350/128 |
| 4,692,359 | 9/1987 | Fitzpatrick | 350/127 X |
| 4,701,019 | 10/1987 | Fitzpatrick | 350/127 |
| 4,701,020 | 10/1987 | Bradley, Jr. | 350/128 |
| 4,725,448 | 2/1988 | Fitzpatrick | 350/127 X |
| 4,730,897 | 3/1988 | McKechnie et al. | 350/128 |
| 4,767,186 | 8/1988 | Bradley, Jr. et al. | 350/128 |

Primary Examiner—Richard A. Wintercorn
Attorney, Agent, or Firm—John C. Fox

[57] ABSTRACT

A front projection screen has lenticules separated by grooves. A black plastic structure having protruding black ribs is aligned with the lenticules so that the ribs protrude into the grooves with clearance on both sides. For a front projection screen the base from which the ribs protrude is shaped to conform to the shape of the tips of the lenticules and is light absorbent. Preferably, the structure is a molded plastic manufactured by the same tooling and replication techniques which produce the lenticular array.

25 Claims, 2 Drawing Sheets

LENTICULAR ARRAYS FOR FRONT PROJECTION SCREENS AND CONTRAST IMPROVING METHOD AND DEVICE

This is a continuation of application Ser. No. 236,562, filed Aug. 25,1988, abandoned, which is a continuation-in-part of Ser, No, 107,087 filed Oct. 6, 1987 now Pat. No. 4,767,186 issued Aug. 30, 1988and assigned to the same assignee. This application is incorporated by reference into the present application as a part thereof, with particular reference to FIG. 4 and the associated description.

BACKGROUND OF THE DISCLOSURE

1. Field of the Invention

The present invention relates to lenticular arrays and methods and devices for absorbing undesired light falling on such arrays.

2. Description of the Prior Art

In apparatus using front projection screens, an image source in front of the screen projections an image onto a screen. The screen reflects light from the image back to viewers in an audience field, also located in front of the screen.

A problem encountered in these front projection systems is that the image contrast is reduced by the presence of ambient light. This is particularly troublesome in those applications in which a dedicated projection room is not practical, for example, projection television for the consumer market. In such cases, the source and character of undesired light such as ambient light is generally unpredictable and uncontrollable.

Image contrast of front projection screens has been increased by various types of blackening to absorb ambient light without interfering with the desired projected light constituting the image. Black masking in the form of light absorbing filaments located in the grooves between the light-spreading lenticules is illustrated in FIG. 2 of the parent case, while in FIG. 3 black masking is accomplished by filling a portion of the grooves between the light spreading lenticules with discrete black particles and by containing the particles by means of a skin which extends between the lenticules over the groove. This black mask construction is also described in U.S. Pat. No. 4,605,283, assigned to the same assignee.

All of the above types of blackening create manufacturing and operating difficulties. The black filaments tend to break and are difficult to position. Particles are difficult to maintain in the groove before being fixed and have a tendency to spread over the tips of the lenticular elements, thereby interfering with the image-forming light. Furthermore, the placement of either filaments or particles within the grooves results in some portion of blackening material touching the sidewalls or being sufficiently close, i.e. within about a micron, that the overall efficiency of the screen is reduced because a portion of the desired light instead of being reflected is absorbed.

SUMMARY OF THE INVENTION

It is an object of the present invention to provide a lenticular array with blackening which is simple to apply, will maintain its shape and position and is both reliable and effective. Futher, use of the blackening should not result in decreased efficiency with respect to the desired light.

A further object of the present invention is to provide selectively deposited silver or other reflective coating on those portions of the tip onto which desired light is directed by the sidewalls of the lenticules.

In accordance with the present invention, a lenticular surface having a plurality of lenticules separated by grooves, each lenticule having a base portion and a tip portion, is porvided with a planar light absorbent surface opposite the tip portions, so that the light absorbent surface absorbs undesired light passing through the lenticule. The lenticule has at least one light-reflecting (mirrored) portion at its tip, so that desired light incident on the mirrored portion is reflected back to an audience space. In a further improved embodiment, the light absorbent surface has protruding light absorbent ribs which extend into the grooves. The ribs may be short relative to the depth of the grooves, or may be as long as the depth of the grooves. The essential feature of the ribs is that they not touch the sides of the lenticular, and not approach touching the sides of the lenticule so that total internal reflection of the desired light is not frustrated.

The combination of the above-described lenticular array with the blackening structure or surface may constitute, for example, a front projection screen in a television receiver.

Further objects and features of the invention will become obvious from the following description, taken in conjunction with the drawings.

BRIEF DESCRIPTION OF THE DRAWING

FIG. 4 is a cross-sectional view of a lenticule having a reflective coating on its tip portion and a planar light absorbing surface opposite the tip.

DESCRIPTION OF THE PREFERRED EMBODIMENTS

Figure 1:
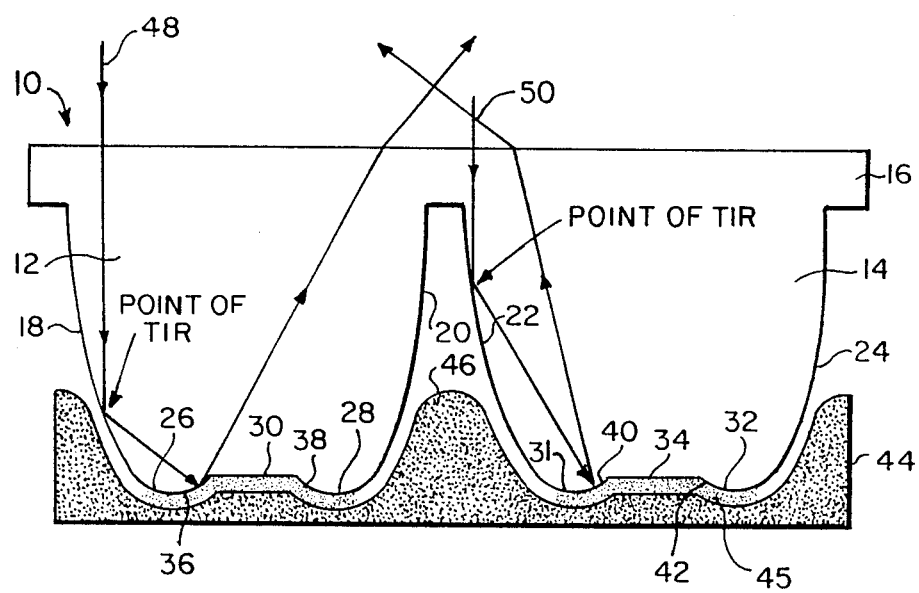
FIG. 1 illustrates the horizontal light distribution created in response to projected rays by a lenticular array having a blackening structure in accordance with the present invention.

In FIG. 1 a lenticular array, generally designated by reference numeral 10, includes a first lenticule 12 and a second lenticule 14. The base 16 of the array is positioned towards the front of the screen, i.e. facing both the audience and the projected rays which are to constitute the image to be shown to the audience. The sides 18 and 20 of lenticule 12, as well as the sides 22 and 24 of lenticule 14 provide total internal reflection (TIR) for projected rays.

The tip portion of lenticule 12 includes arc-shaped portions 26, 28 respectively contiguous to sides 18 and 20, and a flat section 30 connecting sections 26 and 28. Similarly, lenticule 14 has curved portions 31 and 32, joined by a flat portion 34. This particular tip shape is only one example of possible configurations.

The side walls are curved to concentrate the projected light onto the tip region.

As illustrated, the light from each side wall strikes a different half of the tip region, i.e. desired light reflected by sidewall 18 hits only section 26, while light reflected by sidewall 20 impinges only on section 28. Silvering to create a reflecting surface is applied to areas 36 and 38, respectively facing side 18 and side 20, and constituting the portions of sections 26 and 28 on which the desired light is to be concentrated. The straight portion 30 can be eliminated or changed in shape without affecting the above-described functioning. Also, the shape of those portions of 26 and 28 onto which desired light is not concentrated can be changed without affecting the functioning. It is sufficient that the portions 36 and 38 have the proper position and shape to reflect the desired light into the audience space.

The selective deposition of the silver or other reflecting means to create mirrored portions 36 and 38 can be achieved by methods which are well known in the art. For example, photoresist can be applied to the entire tip area. An intense light source placed in a position corresponding to the position the projector will be placed in the end use application exposes the portion of the tip which is to retain the reflecting material. Silver is applied by chemical means to the tip and the unexposed photoresist is chemically removed. Other methods will be readily apparent to one skilled in the art.

The black plastic molded structure which constitutes one embodiment of the blackening structure according to the present invention is designated by reference numeral 44. Adhesive 45 may be interposed between lenticular array 10 and blackening structure 44 to prevent relative movement between the blackening structure and the lenticules.

The adhesive will also be helpful in reducing the reflections of ambient light rays striking section 30 so that nearly all rays are transmitted through the adhesive and into the light absorbing plastic if the refractive index of the absorbing material, and the material of which the lenticular array is made are within 0.3 of the refractive index of the adhesive. If the refractive indices of the materials are matched, there will not be any reflections of these light rays, in accordance with Fresnel's laws of transmission and reflection of light rays, and the lenticules may be said to be optically coupled to the light absorbing material by the adhesive. The adhesive may itself be light absorbing, but that is unnecessary.

Figure 2:
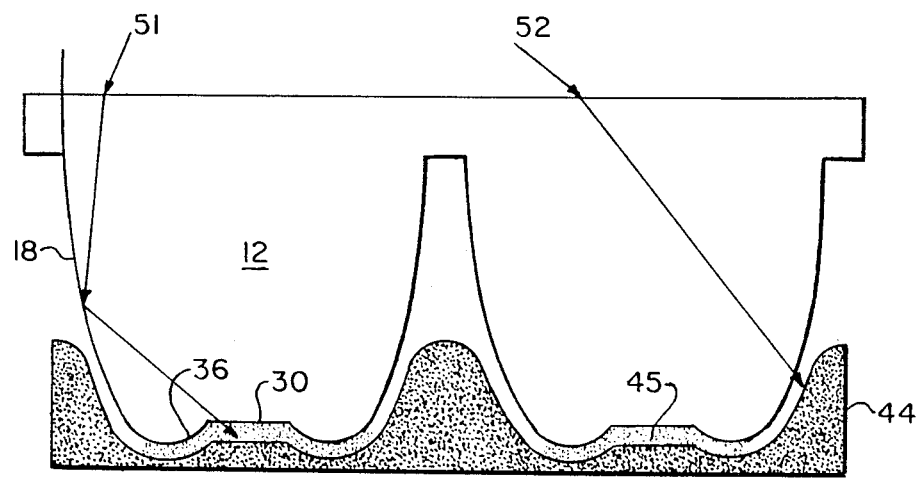
FIG. 2 shows absorption of ambient light in the screen of FIG. 1.
Figure 3:
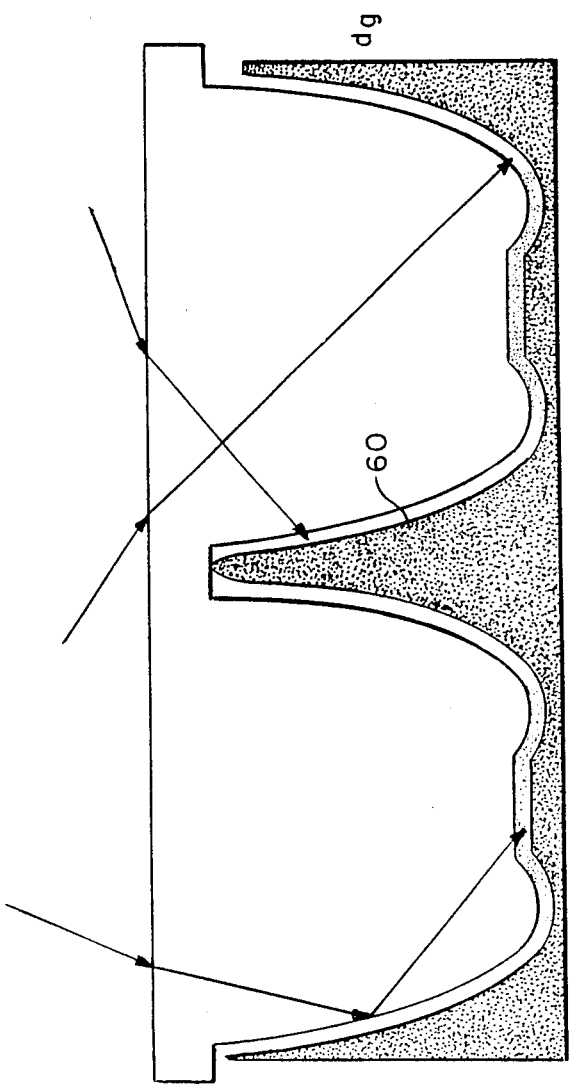
FIG. 3 illustrates a lenticular array with an alternative blackening structure.

It will be noted that the blackening structure of FIGS. 1, 2, 3 has a complementary shape to the lenticules insofar as the tip portion is concerned and that it extends into but does not fill the space between the side wall surfaces, e.g. 20 and 22. Thus there is an array of light absorbing ribs, 46, projecting into the groove between adjacent lenticules without making contact with either side.

As is illustrated in FIG. 1, a light ray 48, a projected ray, impinges on wall 18 at an angle for total internal reflection, is reflected onto surface 36 which is silvered or provided with other reflective coating, and returns through the lenticule to exit towards the audience space. A ray 50, parallel to ray 48, impinges on side 22 of lenticule 14, again at an angle for total internal reflection. It is reflected towards silvered portion 40, and reflected by silvered portion 40 back through the lenticule towards the audience. The desired light, namely the projected rays, will all impinge upon the respective sides of lenticules 12 and 14 from a direction substantially perpendicular to base 16 of the array in the two dimensional cross section, but may be inclined in the veritcal direction. The projected rays will therefore be reflected as illustrated and create a light distribution in the audience space. The required spreading of light in the vertical direction may be accomplished by a horizontal lenticular array on the front surface of the lenticular, i.e. on the opposite side of the sheet containing the rear facing TIR array, or on a separate sheet between the TIR array sheet and the projector, or by a small amount of diffusion, either in the bulk of the screen material or on a surface or by an imbedded horizontal lenticular array (in which case the refractive index of the contiguous layers of the screen must be different, with the change in refractive index being typically 0.1 or greater), or a combination of two or more of these means.

In FIG. 2, the same array and blackening structure is illustrated as was illustreated in FIG. 1, but an incident ray of ambient light, 51, is shown. It will be noted that the angle of incidence of this light differs from that of projected ray 48. Ray 51 is also incident on side 18 of lenticule 12 at and angle creating total internal reflection. However, instead of impinging on silvered surface 36, the ray passes through flat surface 30 of the tip and is absorbed by the blackening structure 44. A second incident ray 52 of ambient light passes through lenticule 14 and is also absorbed by the blackening structure 44. It will be noted that projected rays are reflected from the TIR surfaces of the lenticules, onto the silvered portion of the tips and back through the lenticule towards the audience space. On the other had, ambient light reflected by total internal reflection from the sides of the lenticules impinges onto non-reflective areas of the tips of the lenticules and into blackening structure 44, or it passes through the lenticule also to be absorbed by structure 44. Finally, ambient light may reflect from the first lenticular side wall due to TIR but strike the opposing lenticular side wall at an angle incorrect for TIR and pass through that wall into light absorbing structure 44.

The finger-shaped portions 46 of the blackening structure 44, if present, improve the efficiency of absorption of unwanted light. Such fingers may extend a portion of the height of the groove between the lenticulars or the full available height, but they should be narrower than the width of the lenticular groove at any height so that they neither touch or approach touching the side walls of the lenticules. If the minimum separation of the projection from the lenticular sidewalls is greater than about 1.5 times the wavelength of visible light, there will be no loss of efficiency in the intended total internal reflection of desired projected light.

The blackening structure may be prepared using the same precision tooling and replication techniques as are required to produce the TIR lenticular array. Specifically, a second mold is tooled which is complementary to the lenticular array tool as regards the tip portion but which will replicate a protruding finger or rib portion which is narrower and may not be as high as the depth of the groove with which it will be mated. From this tool a surface is replicated in a medium which, aside from its light absorbing property, has properties similar to those of the plastic of which the TIR lenticular array is replicated. Such a light absorbing medium may be made by dispersing black particles in a medium of the same material of which the lenticular array is made. Light rays readily pass into the transparent medium but upon encountering a black particle are most often absorbed. If the medium in which the light absorbing particles are embedded is the same material, e.g. polymethylmethacrylate, as the medium for the lenticular array, the coefficients of expansion for temperature and moisture changes are similar and warpage of the screen caused by ambient changes is avoided.

To join the lenticular array and light absorbent structure, the two are aligned, the complementary tip portions of the two surfaces being preferably adhered together. Adhesion may be provided by contact adhesive, ultraviolet cured adhesive, heat activated adhesive, microwave radiation activated adhesion, direct bonding, solvent bonding, or other adhesive means.

Specifically, the mating between the lenticular array and the blackening structure can be accomplished as follows. First, the edges of two mating grooves and ribs are mated. Then the two sheets are mated by successively bringing the next rib and groove into contact until the entire surfaces are joined. The process is analogous to the operation of a zipper. The alignment of each subsequent rib and groove is assured by the mated alignment of each preceding groove and rib pair. In practice this can be accomplished by beginning with one piece rolled about a cylinder of appreciable diameter (to avoid undue stress on the part). The sheet may be held by a vacuum platen technique if the obverse side is plane, with the ribs or lenticulars parallel to the axis of the cylinder and opposite the side adjacent to the cylinder surface. The other piece can be laid onto a flat surface. Once the first rib and groove pair are mated, rolling the cylinder while applying pressure will mate the surfaces together. The opposing surface must be permitted to slide along as the mating process continues (it can be laid on a table equipped with the air bearing slide), or the cylinder can be translated as it is rotated. If a final screen with an arc shape in horizontal cross section is desired, as is suggested in the parent case, the second sheet can be laid on a curved platform which has approximately the desired radius of the final completed screen. Maintaining a curved cross section can be facilitated by designing the pitch of the blackening structure equipped with ribs to be slightly greater than that for the lenticular array (for the same conditions of temperature and humidity). When curvature of the assembled screen is correct, the pitches will match because the curvature will reduce the effective pitch of the blackening rib structure while increasing the pitch of the lenticular portion. Subsequent to initial fabrication, the screen may be adhered by conventional means to either a curved or flat substrate.

The reflective coating, e.g. silvering, required in the tip region of each TIR lenticule should be applied prior to the above described mating procedure.

An alternative embodiment of the present invention is illustrated in FIG. 3. The portion of the blackening structure opposite the tip portion of the lenticules is identical to the corresponding portions shown in FIGS. 1 and 2. However, the ribs which fit into the grooves between adjacent lenticules are elongated so as to be substantially as tall as the grooves are deep. Again, there is no contact between the side surfaces on the one hand, and the blackening ribs on the other hand. This embodiment gives the highest possible degree of contrast while having minimal impact on the efficiency of the TIR operation.

The simplest embodiment of the present invention is illustrated in FIg. 4 and was shown in FIG. 4 in the parent case. The same numerals are used herein as were used in the parent case. The lenticule shown in FIG. 4 is generally designated by reference numeral 54. It has a tip portion 54a coated with a layer 56 of light reflecting materials such as aluminum or silver. A planar structure 58, which may be a thin sheet having a light absorbing surface, or being light absorbing in its bulk, is placed behind the lenticular array. Joining between lenticule 54 and structure 58 may be obtained by use of adhesive as described in relation to FIG. 2, above.

The dimensions of the lenticules and the blackening structure depend on the particular application. However typical dimensions are:

Lenticular Array pitch (tip-to-tip distance): 0.25–1.5 mm
height of lenticule: 0.5–5.0 mm Blackening Structure depth of base (distance from highest dimension of lenticule to bottom of structure: <5 mm
thickness of light absorbing plate, per FIG. 4: film or solid structure of desired thickness.

Variations in shape of the lenticule, as well as variations in the above dimensions, are all encompassed by the present invention. The invention is concerned with creating a method and apparatus for blackening lenticular arrays which overcome the disadvantages of the presently known methods, and with a method and apparatus for providing the path of projected light to an audience space by means of light-reflecting portions in the tips of the lenticules.

Although the shape of the blackening structure preferably corresponds substantially to the shape of the lenticule in the tip region, this correspondence is not necessarily required. Where manufacturing difficulties exist, or where other considerations make variations in the shape desirable, such variations can readily be accommodated.

Thus, while the invention has been schematically illustrated in preferred embodiments, it is not to be limited to such embodiments, since other modifications of the basic invention will be evident to those skilled in the art. All such variations are intended to be covered by the following claims.

I claim:

1. Method for making a light absorbing screen which includes a lenticular surface having a plurality of lenticules separated by grooves, the method comprising the steps of:
    creating a structure having a base, and ribs having light absorbing portions protruding from said base;
    aligning said ribs with said grooves so that said ribs project into said grooves; and
    joining the so-aligned structure to said surface having said lenticules, whereby said structure will absorb undesired light passing into said grooves.

2. A method as set forth in claim 1, wherein each of said lenticules has a first and second side, said first side of one of said lenticules and said second side of an adjacent one of said lenticules defining one of said grooves;
    wherein said first and second side of each of said lenticules is joined by a tip portion having a predetermined shape; and
    wherein said ribs extend into said grooves without touching said sides.

3. A method as set forth in claim 2, wherein said base of said structure has a shape complementary to said shape of said tip.

4. A method as set forth in claim 2, wherein each of said grooves has a predetermined groove height measured in the direction of extension of said ribs; and wherein said ribs extend into said grooves for a extension distance equal to a predetermined fraction of said groove height.

5. A method as set forth in claim 4, wherein said extension distance is substantially equal to said groove height.

6. A method as set forth in claim 4, wherein said extension distance is approximately less than three quarters of said groove height.

7. A method as set forth in claim 1, wherein said step of joining comprises the step of gluing said solid structure to said surface having said lenticules at predetermined gluing locations.

8. A method as set forth in claim 7, wherein each of said lenticules has a tip portion; and
   wherein said gluing locations are on said tip portions.

9. A method as set forth in claim 1, wherein said light absorbing portions of each of said ribs cover the whole surface thereof.

10. A method as set forth in claim 9, wherein joining said solid structure to said surface having said lenticules comprises the step of rolling said solid structure onto said surface.

11. A method as set forth in claim 1, wherein desired light travels in a predetermined direction towards said lenticules and impinges thereon at a predetermined angle of incidence;
    and wherein said lenticules have sides providing total internal reflection for light rays incident thereon from said predetermined direction.

12. An optical device comprising:
    a plurality of lenticules each separated by grooves and each lenticule having a base, a tip portion, and reflecting material on said tip portion for reflecting desired light incident thereon to an audience space; and
    a light absorbing means comprising a solid structure having a base and a plurality of light-absorbing ribs protruding from said base into said grooves, for absorbing undesired light, thereby decreasing undesired light entering said audience space.

13. A device as set forth in claim 12, wherein said base of said solid structure is light absorbent throughout.

14. A device as set forth in claim 12, wherein each of said grooves has a predetermined depth;
    and wherein each of said ribs protrudes into a corresponding groove for a distance substantially less than said predetermined depth.

15. A device as set forth in claim 12, wherein each of said grooves has a predetermined depth; and
    wherein each of said ribs extends into a corresponding groove for a distance substantially equal to said predetermined depth.

16. A device as set forth in claim 12, wherein said solid structure is a black plastic structure.

17. A device as set forth in claim 12, wherein each of said grooves is defined by a first side of one of said lenticules and a second side of another of said lenticules; and
    wherein said ribs protrude into said grooves with clearance from said first side and said second side.

18. A device as set forth in claim 12, further comprising adhesive means interposed between said lenticular surface and said solid structure for preventing relative movement therebetween.

19. A device as set forth in claim 12, wherein said lenticules have a predetermined tip shape; and
    wherein said base of said solid structure has a shape complementary to said tip shape.

20. A device as set forth in claim 12, wherein said lenticular surface and said light absorbing means together constitute at least part of a front projection screen.

21. A lenticular array comprising a plurality of lenticules, each of said lenticules having a first side, a second side, and a tip portion joining said first side to said second side, said tip portion having a first surface facing said first side, and a second surface facing said second side;
    and reflective material applied to said first and to said second surface for reflecting light incident thereon into an audience space.

22. A lenticular array as set forth in claim 21, wherein said tip portion has a first part contiguous with said first side and a second part contiguous with said second side;
    and wherein said first part comprises said first surface and said second part comprises said second surface.

23. A lenticular array as set forth in claim 22, wherein said tip portion further has a third part interposed between said first part and said second part.

24. A lenticular array as set forth in claim 23, wherein said third part is substantially planar.

25. A lenticular array as set forth in claim 21, wherein said first side reflects desired light onto said first surface and said second side reflects desired light onto said second surface by total internal reflection.

* * * * *